United States Patent [19]

Boucquey

[11] Patent Number: 5,452,912
[45] Date of Patent: Sep. 26, 1995

[54] ARTICULATED BUS

[75] Inventor: Alain Boucquey, Woluwe-Saint-Pierre, Belgium

[73] Assignee: Van Hool, naamloze Vennootschap, Koningshooikt, Belgium

[21] Appl. No.: 208,300

[22] Filed: Mar. 10, 1994

[30] Foreign Application Priority Data

Mar. 10, 1993 [BE] Belgium .............................. 09300228

[51] Int. Cl.$^6$ ................................................ B62D 53/00
[52] U.S. Cl. ............................ 280/403; 280/424; 105/8.1
[58] Field of Search ................................ 280/403, 424,
280/426, 442, 432, 408, 400, 483, 484,
489; 180/14.1; 105/8.1, 14; 296/178

[56] References Cited

U.S. PATENT DOCUMENTS

| | | | |
|---|---|---|---|
| 2,193,156 | 3/1940 | Antoine | 280/403 |
| 2,251,584 | 8/1941 | Fageol et al. | 280/403 |
| 5,137,107 | 8/1992 | Uttenthaler | 280/232 X |

FOREIGN PATENT DOCUMENTS

| | | |
|---|---|---|
| 0475341 | 3/1992 | European Pat. Off. . |
| 1207220 | 6/1966 | Germany . |
| 3208615 | 9/1983 | Germany . |
| 535722 | 4/1941 | United Kingdom . |

Primary Examiner—Eric D. Culbreth
Assistant Examiner—Victor E. Johnson
Attorney, Agent, or Firm—Bacon & Thomas

[57] ABSTRACT

Articulated bus, in particular of the type with a low floor, whereby said bus has a pulling vehicle (1), a pulled vehicle (2) and an articulated mechanism which connects both vehicles to one another and which contains a rotary junction (3) with a lower part (13) which is connected to the pulling vehicle (1) and an upper part (14) mounted thereupon in a rotating manner around an upward axis of rotation to which the pulled vehicle (2) is connected, whereby the connection between either of these parts (13 and 14) of the rotary junction (3) and the accompanying vehicle (1 or 2) is a hinged joint (20, 22 to 27) with an axis which is diametrically offset from the rotary shaft of the rotary junction (3), characterized in that the hinged joint between a vehicle (1 or 2) and either of the parts (13 or 14) of the rotary junction (3) contains two flexible supporting arms (18), which are situated on either side of the rotary shaft of the rotary junction (3), and which are each fixed to an end of the vehicle (1 or 3) on the one hand, and which are connected in a hinged manner to the part (13 or 14) of the rotary junction (3) on the other hand.

10 Claims, 3 Drawing Sheets

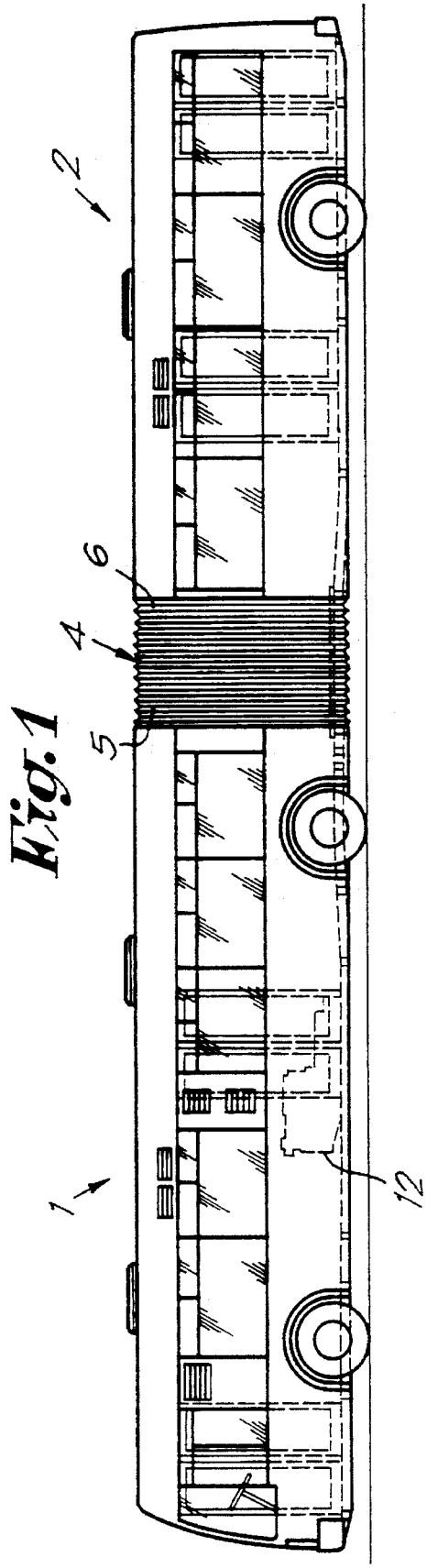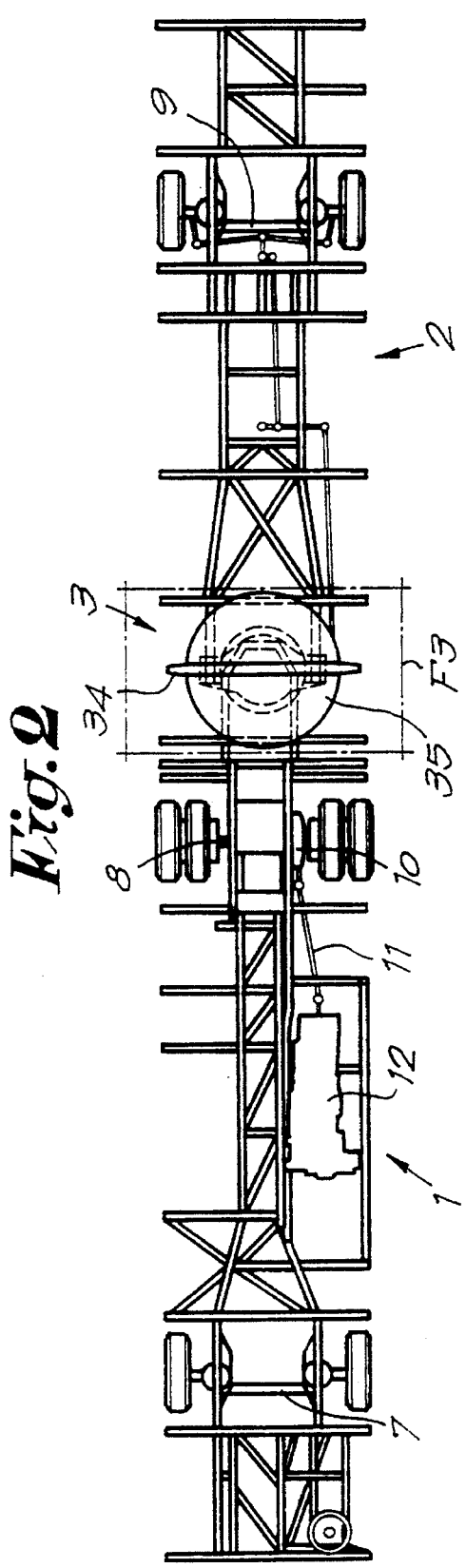

ARTICULATED BUS

BACKGROUND OF THE INVENTION

The present invention concerns an articulated bus, in particular of the type with a low floor, whereby said bus has a pulling vehicle, a pulled vehicle and an articulated mechanism which connects both vehicles to one another and which contains a rotary junction with a lower part which is connected to the pulling vehicle and an upper part mounted thereupon in a rotating manner around an upward axis of rotation to which the pulled vehicle is connected, whereby the connection between either of these parts of the rotary junction and the accompanying vehicle is a hinged joint with an axis which is diagonal to the rotary shaft of the rotary junction.

In known articulated buses of the above-mentioned type, the hinged joint between one of the vehicles and one of the parts of the rotary junction consists of a rigid structure which forms a whole with the vehicle frame and which is connected in a hinged manner with two protruding parts on either side of the rotary shaft to the above-mentioned part of the rotary junction. Such buses are described among others in patents BE-A-872.030 and NL-A-78 11 557.

When the bus drives on a bumpy road, with two road surfaces which are turned in relation to one another, large torques will arise at the height of the articulated mechanism in the structures of the vehicles with such a hinged joint. These torques, which may be very large, can be absorbed in an articulated bus with an ordinary high floor since there is enough room to make the vehicle frames sufficiently strong. In articulated buses with low floors, however, the structural height of the frame or chassis is too limited to absorb such possible torques.

The invention aims to provide an articulated bus whereby torques in the frames at the height of the articulated mechanism are restricted or avoided, such that it is not necessary to make the frame of the vehicles heavier to this aim, and whereby the hinged joint can be made very simple and especially very compact, all this such that, if required, the floor height of the articulated bus can be kept relatively low without any problems.

This aim is realized according to the invention as the hinged joint between a vehicle and either of the parts of the rotary junction contains two flexible supporting arms, which are situated on either side of the rotary shaft of the rotary junction, and which are each fixed to an end of the vehicle on the one hand, and which are connected in a hinged manner to the part of the rotary junction on the other hand.

The flexible supporting arms will be able to reduce any possible torques to an acceptable level thanks to a limited and controlled elastic deformation. These supporting arms form a simple, self-supporting construction which requires only a limited overall height and thus is especially suited to be applied in a low articulated mechanism as is required in an articulated bus with an extremely low floor. The flexible arms are significantly lighter than the conventional rigid constructions which are used instead. Moreover, these flexible arms provide for a significant vibration isolation, which results in more driving comfort for the passenger on bumpy roads.

According to a special embodiment of the invention, the vehicle which is attached in a hinged manner with either of the parts of the rotary junction is the pulled vehicle.

The lower part of the rotary junction is then preferably fixed in a rigid manner to a backward directed protrusion of the frame of the pulling vehicle, whereas the upper part of the rotary junction is fixed in a hinged manner on both sides of the rotary shaft to an end of a flexible arm which is fixed on the front end of the frame of the pulled vehicle.

Practically, the two flexible arms have the shape of parabolic springs.

As already mentioned, the invention is particularly practical for buses with low floors, in particular for such buses whereby the floor of the pulling vehicle and the pulled vehicle are kept at approximately the same level in relation to the ground.

Buses with low floors have been recently developed and are specially built to provide access to disabled and handicapped persons sitting in a wheelchair. In such buses, there are no steps at the door. Moreover, the low floor with low step is usually combined with an extra "kneeling" of the bus at critical bus stops, whereby by means of the pneumatic suspension the superstructure with the floor is lowered in relation to the street or pavement.

New safety problems and problems of structural strength arise with such buses with low floors. Especially the free distance to the road surface at the bottom of the articulated mechanism is critically restricted here on roads with significant slope variations.

With the bus according to the invention, the overall height for building in the articulated mechanism can be limited, such that, taking into account that there should remain a distance of some 200 mm under the articulated mechanism, the floor can be situated at maximum 440 mm above the articulated mechanism. As a result, the floor can be kept at a height of maximum 330 mm above the ground floor over the entire length of the vehicles. The small difference in floor height between the doors and the intermediate floor above the articulated mechanism can be absorbed by means of a slight floor inclination of maximum 6.5%.

In the known articulated buses with a normal floor height, the available overall volumes with the articulated mechanisms are much higher, so that other mechanisms can be used here.

In the articulated buses with low floors, the frame or chassis structure is restricted to the minimum because of the extremely low floor, such that also the structural strength is restricted to the minimum. The two flexible supporting arms which are applied according to the invention are simple, self-supporting constructions which are relatively light and do not require much overall height.

The invention is applicable for articulated buses in which the shaft of the pulled vehicle consists of a rigid shaft, but it is especially useful for articulated buses whereby the wheels of the shaft of the pulled vehicle are steered. With these latter buses, when taking a bend, the pulled vehicle slays more or less in the same path as the pulling vehicle, as a result of which any danger for oncoming traffic is significantly reduced and the outer turning radius of the vehicle is restricted.

According to a preferred embodiment of the invention, the two flexible supporting arms are fixed to the frame of the accompanying vehicle as they are attached between two clamping pieces situated on top of one another which are fixed on top of a part of the frame by means of bolt connections.

By means of shims of varying heights which are placed under the flexible supporting arm, the height between the two vehicles can be adjusted, and the necessary production tolerances can be absorbed.

BRIEF DESCRIPTION OF THE DRAWINGS

In order to better explain the characteristics of the invention, the following preferred embodiment of an articulated bus according to the invention, is described by way of example without being limitative in any way, with reference to the accompanying drawings, where:

FIG. 1 shows a side view of an articulated bus according to the invention;

FIG. 2 shows a too view of the articulated bus according to FIG. 1 without the superstructure;

DETAILED DESCRIPTION OF THE PREFERRED EMBODIMENT

Figure 3:
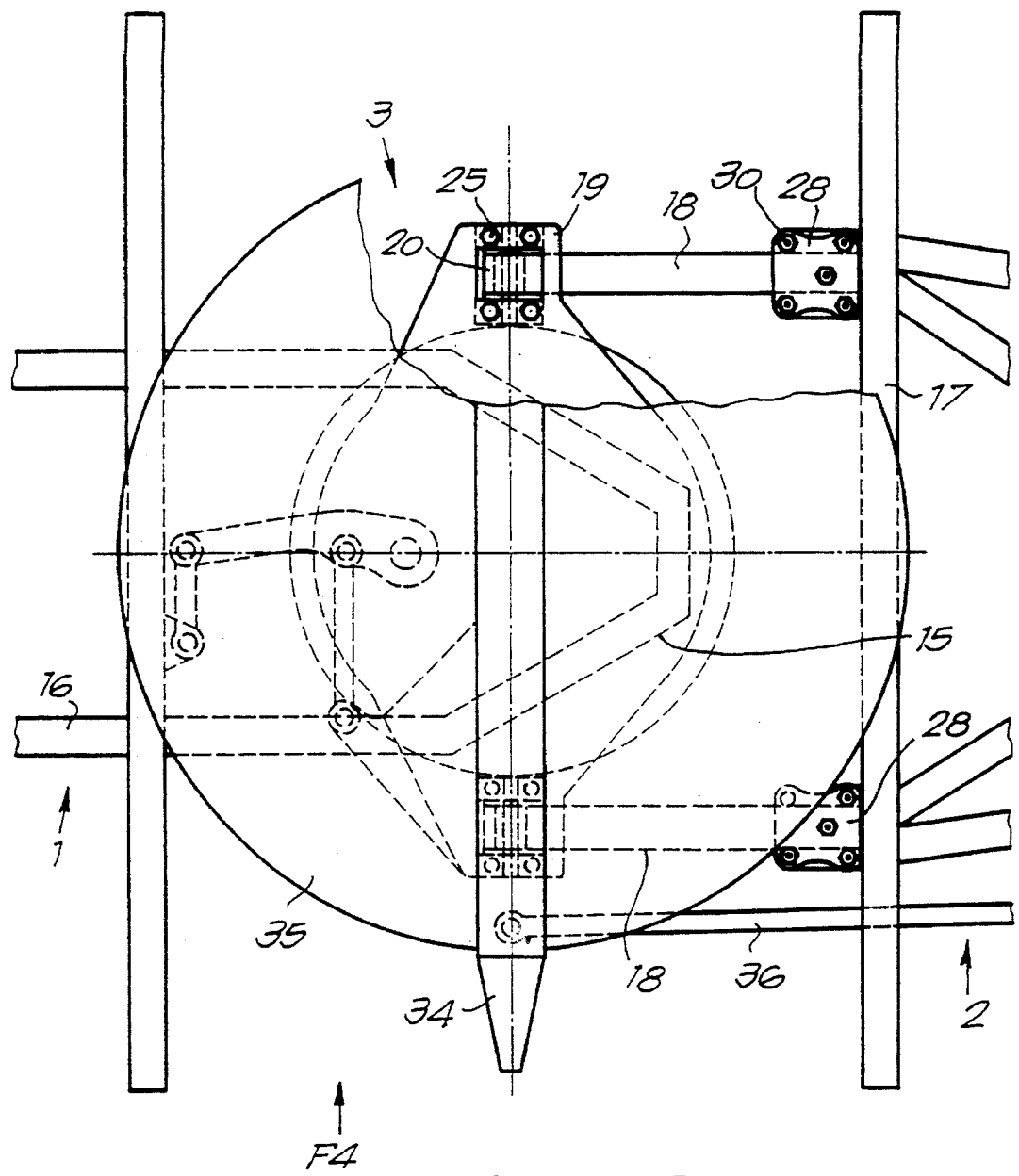
FIG. 3 shows the part which is indicated in FIG. 2 by F3 to a larger scale.
Figure 4:
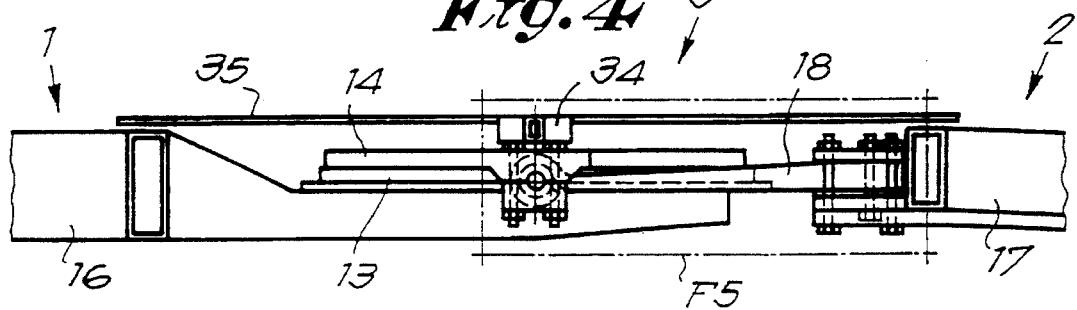
FIG. 4 shows a side view according to arrow F4 in FIG. 3.
Figure 5:
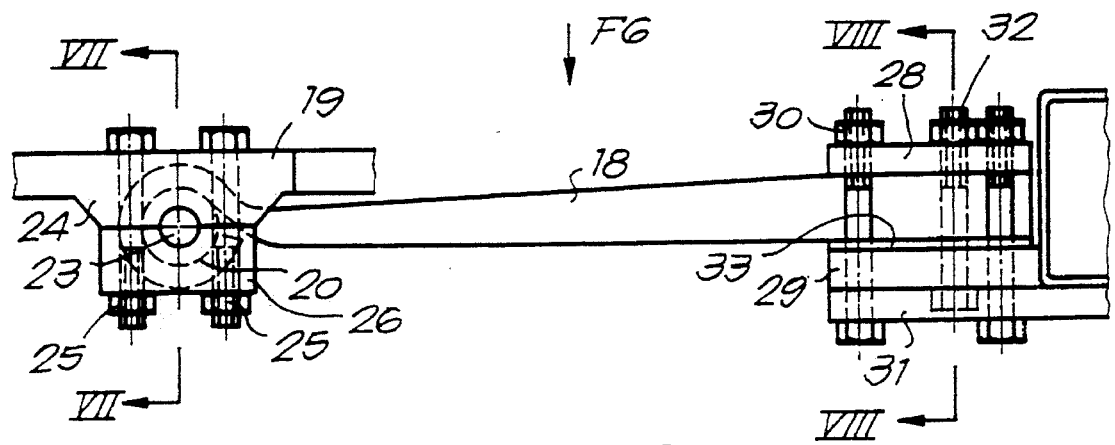
FIG. 5 shows the part which is indicated in FIG. 4 by F5 to a larger scale.
Figure 6:
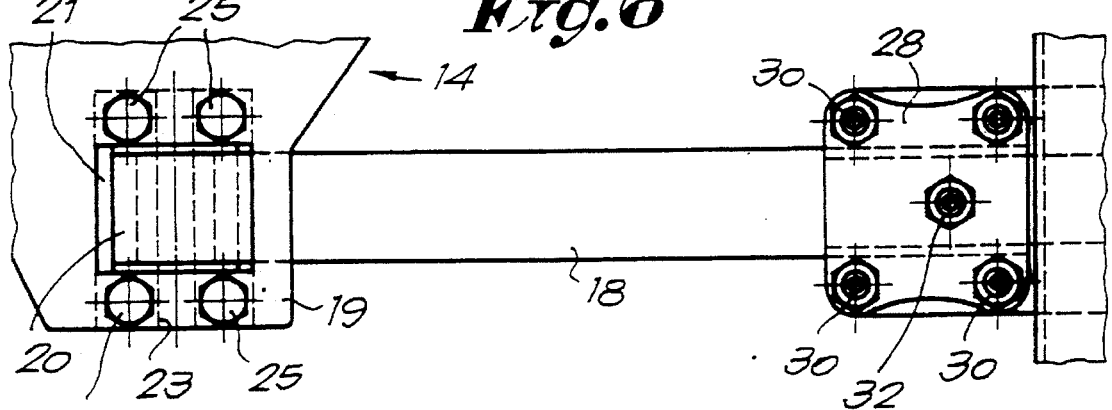
FIG. 6 shows a top view according to arrow F6 in FIG. 5.
Figure 7:
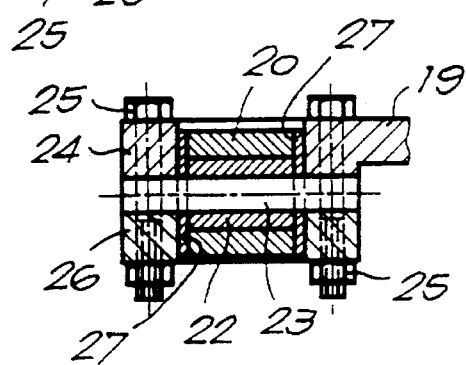
fig. 7 shows a section according to line VII-VII in FIG. 5.
Figure 8:
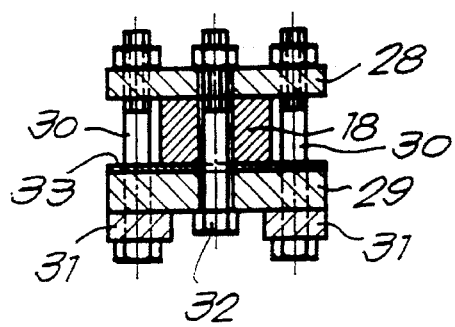
FIG. 8 snows a section according to line VIII-VIII in FIG. 5.

FIG. 1 shows an articulated bus according to the invention which mainly consists of a pulling vehicle 1 and a pulled vehicle 2 which are connected to one another in a suited, hinged manner by means of an articulated mechanism which mainly consists of what is generally called a rotary junction 3, and whereby, as is known, a porch 4 is provided between the two vehicles 1 and 2 in between which accordion-shaped closing parts 5 and 6 are provided.

As is clear from the FIGS. 1 and 2, the pulling vehicle 1 rest on two shafts, 7 and 8 respectively, whereas the pulled vehicle 2 rests on one shaft 9, all this such that the shaft 7 carries the actual steering wheels of the vehicle 1, the shaft 8 the driving wheels thereof, and the shaft 9 extra steering wheels which automatically adjust the vehicle 2 when a bend is taken.

The driving wheels which are carried by the shaft 8 are driven by a motor 12 via a differential 10 placed off center and a cardan shaft 11, which is situated on one side of the vehicle 1.

The articulated mechanism 3 mainly consists, as is known, of a lower part 13 and a too part 14 which is fixed in a rotating manner around an upwardly directed theoretical axis, but in an axially non-sliding manner on the lower part 13.

The lower part 13 is rigidly fixed on a backwardly directed protrusion 15 of the frame 16 of the pulling vehicle 1. The top part 14 is connected in a hinged manner to the front end of the frame 17 of the pulled vehicle 2, more in particular via two flexible arms 18 in the shape of parabolic springs.

The front ends of the two flexible arms 18 are fixed in a hinged manner, on both sides of the rotary shaft of the rotary junction 3, onto two protrusions 19 respectively of the top part 14 directed towards the two sides of the bus. To this end, each arm 18 ends in an eye 20 which surrounds a bush 22 at the height of a recess 21 in a protrusion 19, which itself surrounds a shaft 23 upon which arm 18 is mounted in a rotating manner. The shaft 23 is clamped with its ends, on both sides of the recess 21, between a clamping piece 24 formed on the bottom side of the protrusion 19 and a second clamping piece 26 attached to it by means of bolt connections 25.

In between the clamping pieces 24 and 25 and the eye 20, the shaft 23 is also surrounded by a ring 27. The two shafts 23 are directed according to a common hinge pin which extends through the rotary shaft of the rotary junction 3.

With its rear end, each of the two flexible arms is rigidly connected to the frame 17 by means of two clamping pieces 28 and 29 formed of flat plates and situated on top of one another, which are connected to one another and to forwardly protruding supports 31 which are welded on the bottom side of the front end of the frame 17 by means of bolt connections 30. The arm 18 itself is also connected to the two clamping pieces 28 and 29 by means of a bolt connection 32. Between the bottom clamping piece 29 and the arm 18, one or move shims 33 of various thicknesses can be provided to allow for a height adjustment of the vehicles 1 and 2 in relation to one another.

On top of the top part 14 of the rotary junction 3, a sleeper 34 is mounted in a manner known in the art. The sleeper 34 carries the porch 4 and to which is attached a passengers' floor 35, consisting of a front and a rear half, all this such that the angle of rotation of said passengers' floor 35 is limited. As is also known in the art, sleeper 34 control the steerage of the third shaft 9 via a system of rods 36. However, the steerage can also be controlled in other ways.

Further, an anti-buckle security device against excessive angles of rotation during reversing can be provided between the two vehicles 1 and 2. This security device may consist of adjustable cams which are mounted on the top part 14 of the rotary junction 3 and which can cooperate with electric switches which are set up fixed in relation to the lower part 13 and which activate the vehicle brakes as soon as the angle of rotation becomes too large.

From the aforesaid it is clear that both the rotary junction 3 and the flexible arms 18 require little height, such that the floor of the vehicles 1 and 2 can be kept extremely low. The passengers' floor 35 can be situated at a maximum height of 440 mm above the ground floor.

The flexible arms 18 have a limited height. They provide for a torsion-free connection between the vehicles 1 and 2 without hindering the horizontal turning possibility via the rotary junction 3 or the vertical turning possibility via the shafts 23. A typical horizontal angle of rotation is 45° to 48° to the right and to the left in relation to the road surface, whereas a typical vertical angle of rotation between the vehicles is 8° to 10° upwards, downwards respectively.

Moreover, this flexible connection allows for a controlled steering of the wheels of the pulled vehicle as well as a restriction of the horizontal angle of rotation of the passengers' floor 35 above the rotary junction 3 and the use of the above-mentioned anti-buckle security device.

The present invention is by no means limited to the embodiment described above and represented in the accompanying drawings. On the contrary, such an articulated bus can be made according to all sorts of variants while still remaining within the scope of the invention.

I claim:

1. In an articulated bus including a pulling vehicle, a pulled vehicle and an articulation mechanism interconnecting the pulling and pulled vehicles through a lower part that is connected to the pulling vehicle and an upper part that is connected to the pulled vehicle and rotatably mounted upon the lower part at a rotary junction that is formed as part of said articulation mechanism and which defines a rotation axis, said articulated bus comprising joint means providing a hinged connection between one of said lower and upper parts and a respective one of said pulling and pulled vehicles, said joint means including a pair of supporting arms diametrically spaced on opposing sides of said rotary junction, each of said supporting arms including a first end fixed to said respective one of said pulling and pulled vehicles and a second end hingedly attached to said one of said lower and upper parts each of said supporting arms including a central section between the first and second ends thereof, each of said central sections being flexible such that each of said supporting arms defines a spring.

2. The articulated bus according to claim 1, wherein the first end of each of said supporting arms is fixed to said pulled vehicle.

3. The articulated bus according to claim 2, wherein said pulling vehicle includes a frame having a rearwardly directed protrusion upon which said lower part is fixedly secured and said pulled vehicle includes a frame to which the first end of each of said supporting arms is fixed.

4. The articulated bus according to claim 1, wherein each of said pulling and pulled vehicles include floors that are maintained, through said articulation mechanism, at a substantially equal, low vertical height.

5. The articulated bus according to claim 1, wherein said pulled vehicle includes at least one pair of steerable wheels.

6. The articulated bus according to claim 1, wherein the first end of each of said supporting arms is positioned between a pair of clamping members fixedly secured by means of mechanical fasteners to said respective one of said pulling and pulled vehicles.

7. The articulated bus according to claim 6, further comprising at least one shim positioned between the first end of one of said supporting arms and a respective one of said clamping members.

8. The articulated bus according to claim 1, wherein said joint means includes an eye portion, defined at the second end of each of supporting arms, which receives a shaft attached to said one of said lower and upper parts.

9. The articulated bus according to claim 8, wherein each said shaft defines a longitudinal axis that intersects the rotation axis defined by said rotary junction.

10. The articulated bus according to claim 8, wherein each eye portion is positioned in a recess formed in a lower surface portion of said upper part.

* * * * *